(12) United States Patent
Miller

(10) Patent No.: US 7,337,797 B1
(45) Date of Patent: Mar. 4, 2008

(54) BALL VALVE AND METHOD OF MANUFACTURE

(75) Inventor: Kent Alan Miller, Washington, PA (US)

(73) Assignee: Harsco Technologies Corporation, Fairmont, MN (US)

( * ) Notice: Subject to any disclaimer, the term of this patent is extended or adjusted under 35 U.S.C. 154(b) by 117 days.

(21) Appl. No.: 11/440,629

(22) Filed: May 25, 2006

(51) Int. Cl.
 *F16K 5/06* (2006.01)
(52) U.S. Cl. ............... 137/15.22; 251/170; 251/192; 251/315.1
(58) Field of Classification Search ............ 251/170, 251/171, 192, 315.1, 315.14; 137/15.22; 29/890.132, 441.1
 See application file for complete search history.

(56) References Cited

U.S. PATENT DOCUMENTS

| | | | | |
|---|---|---|---|---|
| 3,323,542 A | * | 6/1967 | Magos et al. ............... 251/172 |
| 3,410,461 A | * | 11/1968 | Barker ................... 251/315.05 |
| 4,381,712 A | * | 5/1983 | Black ......................... 29/441.1 |
| 4,667,926 A | * | 5/1987 | Takeda et al. .............. 251/170 |
| 4,678,161 A | * | 7/1987 | Bando et al. ................ 251/171 |
| 5,735,047 A | * | 4/1998 | Evans et al. ............. 29/890.13 |
| 6,217,002 B1 | * | 4/2001 | Shafer ........................ 251/171 |
| 6,425,571 B1 | * | 7/2002 | Schadewald et al. .. 251/315.13 |
| 2005/0039798 A1 | * | 2/2005 | Meyer ......................... 137/539 |

\* cited by examiner

*Primary Examiner*—John Bastianelli
(74) *Attorney, Agent, or Firm*—David C. Jenkins; Eckert Seamans Cherin & Mellott, LLC

(57) ABSTRACT

A ball valve having a ball valve assembly disposed within a unitary, elongated tube is provided. The unitary, elongated tube has a first, inlet end, a medial portion having a cross-sectional area, and a second, outlet end. The first, inlet end is a swedged tube having a cross-sectional area that is less than the medial portion cross-sectional area. The second, outlet end is also a swedged tube having a cross-sectional area that is less than the medial portion cross-sectional area. The ball valve assembly is disposed within the medial portion.

7 Claims, 3 Drawing Sheets

BALL VALVE AND METHOD OF MANUFACTURE

BACKGROUND OF THE INVENTION

1. Field of the Invention

This application relates to a ball valve and, more specifically, to a ball valve for an air conditioner/refrigerator having a ball valve member disposed within a unitary tube.

2. Background Information

Ball valves have a housing that defines a passage and a ball valve member disposed therein. The ball valve member is a sphere having a central passage. The ball rotates between a first, closed position, wherein the ball valve member central passage is not aligned with, nor in fluid communication with, the housing passage and a second position, wherein the ball valve member central passage is aligned with, and in fluid communication with, the housing passage. A handle, typically referred to as a "stem," has a first, inlet end coupled to the ball valve member and a second, outlet end that extends outside the housing. Rotation of the ball valve member is effected by rotating the stem.

A ball valve housing for an air conditioner/refrigerator typically includes a copper inlet tube, a brass fitting, and a copper outlet tube. The brass fitting is structured to support and sealingly engage the ball valve member and the stem. The brass fitting has two halves which are disposed about the ball valve member then joined and welded together. The brass fitting also has an inlet port and an outlet port. The copper inlet tube is brazed to the inlet port. The copper outlet tube is brazed to the outlet port. The distal ends of the copper inlet tube and the copper outlet tube are structured to be coupled to the fluid system for an air conditioner/refrigerator.

This configuration has several disadvantages. For example, the assembly of a welded ball valve is expensive and time consuming requiring technicians proficient in welding. However, even with skilled technicians, the weld/braze locations are subject to leakage. Further, the present design, with the brass fitting being the major component, is more expensive than a design wherein a less expensive metal is the major component.

Accordingly, there is a need for a ball valve having a unitary body that is free from welds.

There is a further need for a ball valve that may be manufactured in a cost effective manner.

SUMMARY OF THE INVENTION

These needs, and others, are met by the present invention which provides a ball valve having a unitary tube structured to enclose a ball valve assembly. The ball valve assembly includes two fittings, preferably made from brass, which are compressed about a ball valve member by a sealing device. The fittings are sealingly disposed in a tube, preferably a copper tube, having a medial portion and two swedged ends.

That is, a copper tube having a first diameter is provided. The copper tube is sized to accommodate the ball valve assembly fittings. A first end of the copper tube is altered by one or more known metal working techniques so that the first end has a diameter that is smaller than the original diameter. A radial opening is also created in the tube medial portion. The bulk of the ball valve assembly, essentially everything but the stem, is inserted into the medial portion via the second end. More specifically, the first fitting and the ball valve member are inserted initially. The stem is inserted through the radial opening and coupled to the ball valve member. In one embodiment, the sealing device is a threaded torus that is coupled to an extension with threads on the second fitting. The second fitting is inserted into the medial portion thereby trapping the ball valve member between the fittings. The medial portion is then crimped inwardly at the location of the torus. In this manner the torus is fixed to the medial portion. Once the torus is fixed at a location, rotation of the second fitting causes the second fitting to move relative to the torus. The first fitting engages a load bearing structure, which is preferably a frustum-shaped section of the tube medial portion, to resist the movement of the second fitting. Thus, the second fitting may be rotated so as to compress the ball valve member. The second end is then altered by one or more known metal working techniques so that the second end has a diameter that is smaller than the original diameter.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, "coupled" means a link between two or more elements, whether direct or indirect, so long as a link occurs.

As used herein, "attached" means that two elements are coupled and in direct contact with each other.

As used herein, "unitary" shall mean an integral body that does not include separate components coupled together by a fastening means such as, but not limited to, welding.

As used herein, "swedged" shall mean a metal construct that was once one size but has been reduced to a smaller size.

Figure 1:
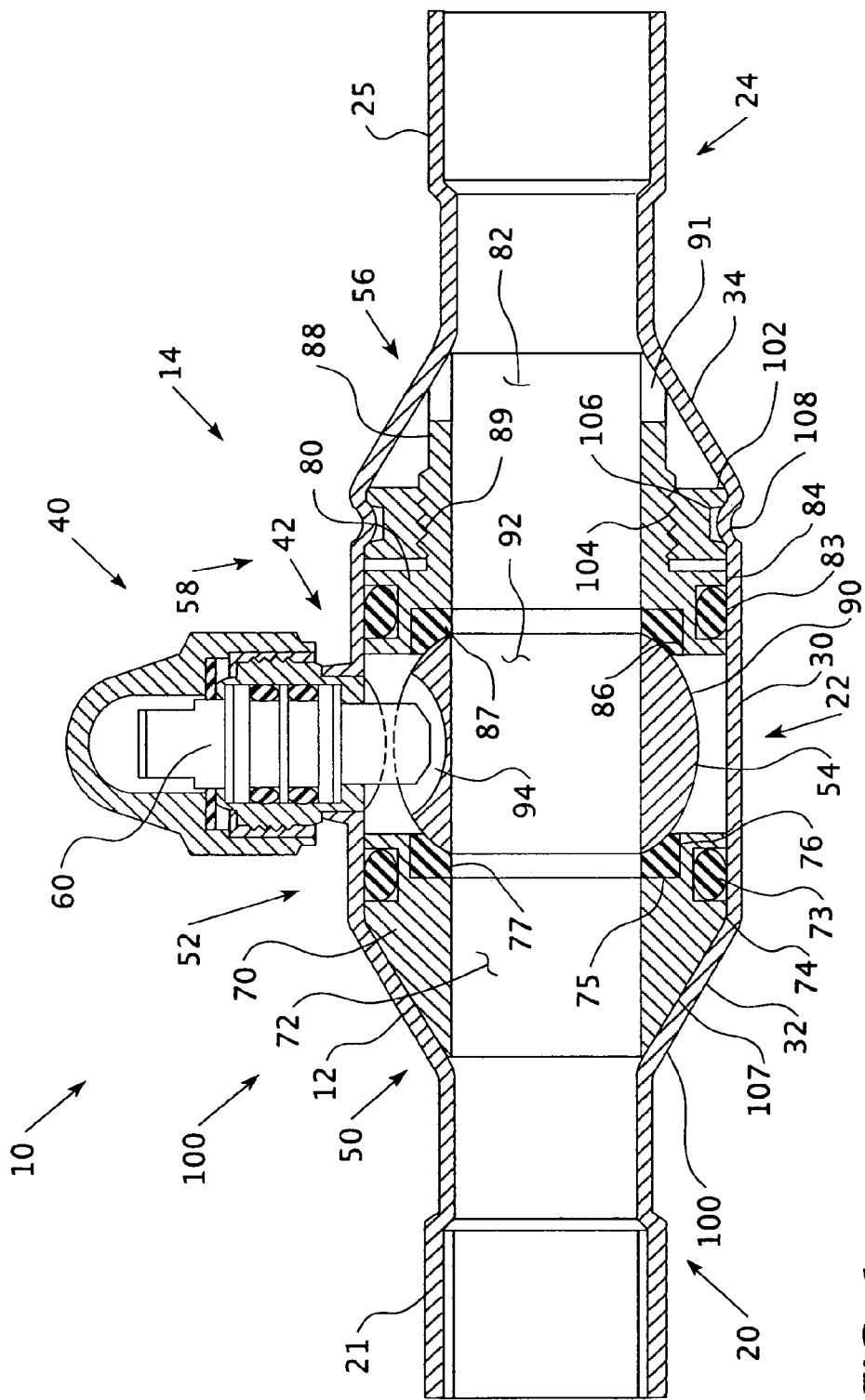
FIG. 1 is a cross-sectional side view of a ball valve.

As shown in FIG. 1 a ball valve 10 includes a unitary, elongated tube 12 and a ball valve assembly 14. Preferably, the tube 12 has a generally circular cross-sectional area. The tube 12 is made of a metal selected from a group including copper, copper based alloys, ferrous steel materials and aluminum. The tube 12 has a first, inlet end 20, a medial portion 22 having a cross-sectional area, and a second, outlet end 24. The first, inlet end 20 is a swedged tube having a cross-sectional area that is less than the medial portion 22 cross-sectional area. Similarly, the second, outlet end 24 is a swedged tube having a cross-sectional area that is less than the medial portion 22 cross-sectional area. The tube 12 also includes a stem neck assembly 40, discussed below.

The medial portion 22 has a central section 30 with a generally constant cross-sectional area. The medial portion 22 also has a first section 32 disposed between the central section 30 and the first, inlet end 20. The medial portion 22 also has a second section 34 disposed between the central section 30 and the second, outlet end 24. The first section 32 and the second section 34 are, preferably, shaped as hollow frustums. That is, the first section 32 and the second section 34 are each a generally linear transition between the medial portion central section 30 and the first, inlet end 20 and the second, outlet end 24, respectively. Additionally, the first, inlet end 20 has a distal tip 21 having an expanded diameter. Preferably the first end distal tip 21 has a cross-sectional area larger than the tube first, inlet end 20 but smaller than the medial portion 22. Similarly, the second, outlet end 24 has a distal tip 25 having an expanded diameter. Preferably the second end distal tip 25 has a cross-sectional area larger than the tube second, outlet end 24 but smaller than the medial portion 22. Each distal tip 21, 25 is adapted to be coupled to a fluid system (not shown) such as, but not limited to, an air conditioner/refrigerator system.

The ball valve assembly 50 includes a first fitting 52, a ball valve member 54, a second fitting 56, a sealing device 58 and a stem 60. The first fitting 52 includes a body 70 having a central passage 72, an outer side 74, and an inner side 76. Similarly, the second fitting 56 has a body 80 having a central passage 82, an outer side 84, and an inner side 86. In the embodiment shown, the second fitting 56 also includes an extension 88 having threads 89 disposed on an outer surface and a tool engagement structure 91, such as, but not limited to a slot. The extension 88 and threads 89 interact with the preferred sealing device 58. Each fitting body 70, 80 is, preferably, shaped as a ring or torus. The first fitting body 70 has a groove 71 extending about the first fitting body outer side 74. A first fitting body outer seal 73 is disposed in the first fitting body groove 71. The first fitting body outer seal 73 is structured to sealingly engage both the first fitting body 70 and the tube 12. The first fitting body 76 also has a notch 75 extending about the first fitting body inner side 76. A first fitting body inner seal 77 is disposed in the first fitting body notch 75. The first fitting body inner seal 77 has a spherical inner surface and is structured to engage the ball valve member 54. Similarly, the second fitting body 80 has a groove 81 extending about the second fitting body outer side 84. A second fitting body outer seal 83 is disposed in the second fitting body groove 81. The second fitting body outer seal 83 is structured to sealingly engage both the second fitting body 80 and the tube 12. The second fitting body 80 also has a notch 85 extending about the second fitting body inner side 86. A second fitting body inner seal 87 is disposed in the second fitting body notch 85. The second fitting body inner seal 87 has a spherical inner surface and is structured to engage the ball valve member 54.

The ball valve member 54 has a body 90 with a central passage 92, and a coupling device 94. The coupling device 94 is, preferably a slot 96 structured to engage the stem tongue 63 as described below. The ball valve member 54 central passage 92 is sized to be about the same as the first fitting central passage 72 and the second fitting central passage 82. As such, the ball valve member 54 is sized to be disposed between the first fitting 52 and the second fitting 56. The ball valve member body 90 is shaped to engage the first fitting body inner seal 77 and the second fitting body inner seal 87.

When assembled, the ball valve assembly 50 has the ball valve member 54 disposed between the first fitting 52 and the second fitting 56. The sealing device 58, described below, is structured to compress the ball valve member 54 between the first fitting 52 and the second fitting 56 and, as such, the first fitting 52 and the second fitting 56 each sealingly engage the ball valve member 54. The stem 60 is coupled to the ball valve member coupling device 94 and is the structured to rotate the ball valve member 54 between a first, closed position, wherein the ball valve member central passage 92 is not aligned with, nor in fluid communication with, the first and second fitting central passages 72, 82, and a second, open position, wherein the ball valve member central passage 92 is aligned and in fluid communication with the first and second fitting central passages 72, 82.

Additionally, the ball valve assembly 50 is structured to be disposed within the medial portion 22 of the tube 12. The ball valve assembly 50 is sized so that the first fitting body outer seal 73 and the second fitting body outer seal 83 sealingly engage the inner surface of the tube 12. In this configuration a fluid may be selectively allowed to pass between the first inlet end 20 and the second inlet end 24 of the tube 12.

The sealing device 58 is structured to bias the first and second fittings 52, 54 sealingly against the ball valve member 54. The sealing device 58 may have many configurations, such as, but not limited to, a plurality of set screws (not shown) extending between the first and second fittings 52, 54. Such set screws could be actuated to draw the first and second fittings 52, 54 toward each other and thereby compress the ball valve member 54. However, in the preferred embodiment the sealing device 58 utilizes a section of the tube medial portion 22 as a load bearing structure 100 and a threaded member 101, preferably a torus 102. The torus 102 has an inner side 103 having a threaded surface 104 and an outer side 105 having a groove 106. Additionally, the first fitting 52 includes a stop surface 107 structured to engage the load bearing structure 100. As noted above, the tube medial portion 22 includes a first section 32 shaped as a hollow frustum. This section is the load bearing structure 100. The stop surface 107 is shaped as a frustum having the first fitting central passage 72 extending therethrough. The stop surface 107 is sized to engage the medial portion first section 32 and thereby maintain the first fitting 52, and therefore the ball valve assembly 50, within the tube medial portion 22. The torus 102 is disposed within the tube medial portion 22 adjacent to the interface between the medial portion central section 30 and the medial portion second section 34. The medial portion central section 30 is crimped inwardly at the location of the torus 102 so that the crimp 108 engages the torus groove 106. Preferably, the torus 102 is fixed to the tube 12 in this manner. The torus inner threaded surface 104 is structured to engage the second fitting extension 88 with threads 89. In this configuration, when the second fitting 56 is rotated in the proper direction within the tube medial portion 22, the second fitting 56 moves away from the torus 102 causing the first fitting 52 to engage the load bearing structure 100 and to compress the first and second fittings 52, 56 into a sealing engagement with the ball valve member 54. To assist in the rotation of the second fitting 56, the tool engagement structure 91 on the second fitting 56 is adapted to be engaged by a torquing tool having a screwdriver-like tip.

Figure 1A:
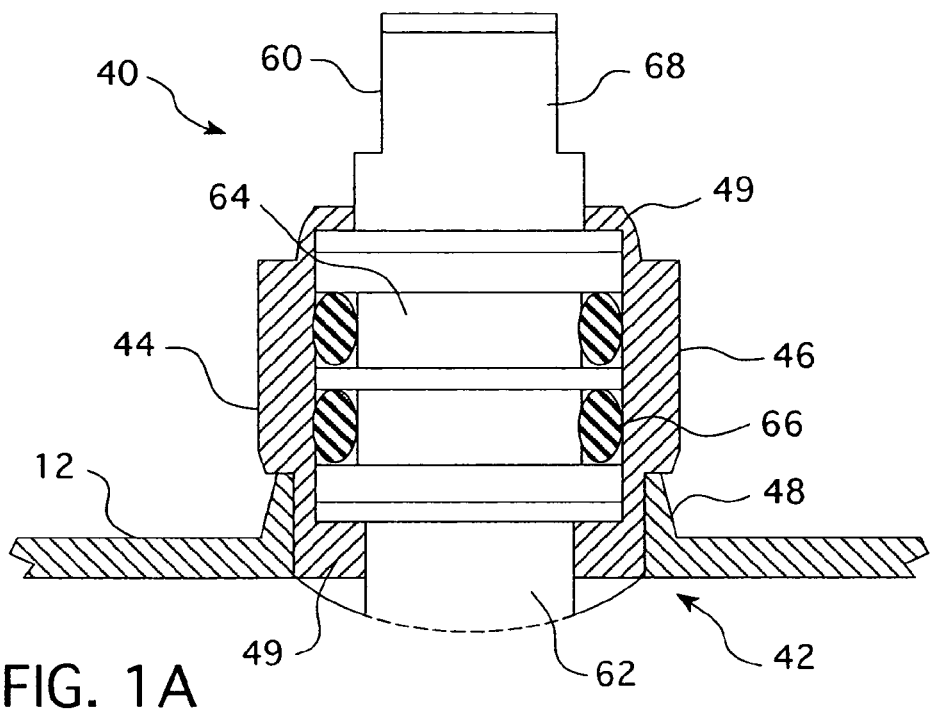
FIG. 1A is a detailed view of the ball valve stem neck.

As set forth above, the tube 12 also includes a stem neck assembly 40. The tube 12 has a radial opening 42 extending radially through the medial portion central section 30. As shown in FIG. 1A, the stem neck assembly 40 includes a generally cylindrical, hollow body 44 having an upper, wide portion 46 and a lower, narrow portion 48. The lower, narrow portion 48 is sized to pass through the radial opening 42. The lower, narrow portion 48 includes an inwardly extending flange 49. The upper, wide portion 46 extends radially outwardly from the tube 12. The upper, wide portion 46 also has a distal lip 47. A valve assembly stein 60, which is part of the ball valve assembly 14 (detailed above) extends through the stem neck body 44. The valve assembly stem 60 is generally cylindrical and has a first narrow end 62, a medial wide portion 64 that supports one or more seals 66, and a second narrow end 68. The transition between the stem first narrow end 62 and the stem medial wide portion 64 is generally a right angle. Similarly, the transition between the stem second narrow end 68 and the stem medial wide portion 64 is generally also a right angle. The stem medial wide portion 64 has a greater diameter than the flange 49 and, as such, the stem medial wide portion 64 abuts the flange 49 while the stem first narrow end 62 extends through the flange 49 and the radial opening 42. The stem first narrow end 62 further has a tongue 63 that is structured to engage the ball valve member slot 96. Additionally, the lip 47 is crimped about the transition between the stem second narrow end 68 and the stem medial wide portion 64. As such, the stem 60 is rotatably captured in the stem neck assembly 40 and engages the ball valve member 54.

As noted above, the first and second fittings 52, 56 sealingly engage both the tube 12 and the ball valve member 54 and, as such, the space between the ball valve member 54 and the stem neck assembly 40 is also sealed. However, the stem neck assembly 40 may still be sealed as a precaution. For example, the stem neck assembly 40 may be brazed to the tube 12 and the stem seals 66 may be used to ensure a fluid passage does not exist through the stem neck assembly 40. That is, the stem seals 66 sealingly engage the inner surface of the stem neck body 44.

Figure 1B:
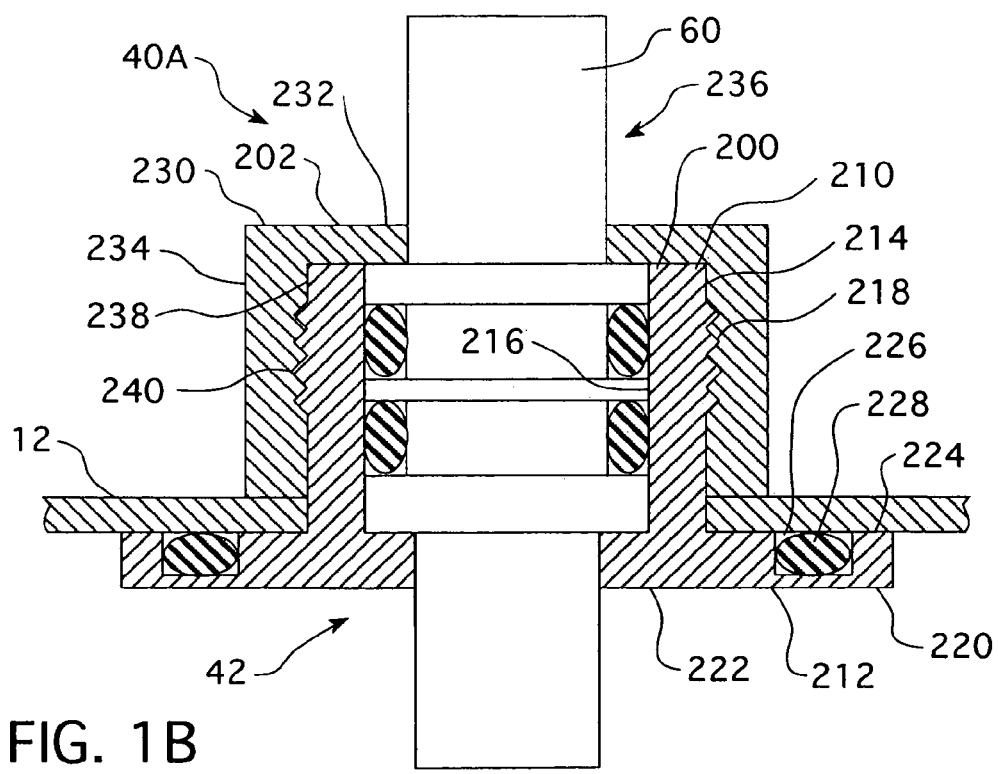
FIG. 1B is a detailed view of an alternate ball valve stem neck.

As shown in FIG. 1B, an alternate stem neck assembly 40A does not require brazing. In this embodiment, the stem neck assembly 40A includes a first, inner member 200 and an outer member 202. The stem 60 is substantially similar to the stem of the prior embodiment and identical reference numbers will be used. The inner member has a hollow, generally cylindrical body 210 with a flange 212 at one end. The flange 212 is shaped to correspond to the shape of the inner surface of the tube 12. The inner member body 210 has an outer surface 214 and an inner surface 216. A portion of the inner member body outer surface 214 includes a threaded portion 218. The inner member flange 212 has an outwardly extending portion 220 and an inwardly extending portion 222. The flange inwardly extending portion 222 acts in a manner similar to the flange 49 in the prior embodiment. That is, the flange inwardly extending portion 222 is structured to abut the stem medial wide portion 64 and prevent the stem 60 from moving into the tube 12. The flange outwardly extending portion 220 has an upper side 224 that engages the tube 12. A groove 226 is located on the flange outwardly extending portion upper side 224. A seal 228 is disposed in the flange outwardly extending portion upper side groove 226. The outer member 202 has an inverted cup-shaped body 230 having a planar portion 232 and a depending, descending side wall 234. The planar portion 232 has a central opening 236 for the stem 60. The outer member side wall 234 has an inner surface 238 having a threaded portion 240. The outer member side wall threaded portion 240 is structured to engage the inner member body outer surface threaded portion 218. In this configuration, the inner member 200 may be installed within the tube 12 with the inner member body 210 extending through the radial opening 42. The stem 60 is then disposed within the inner member body 210. The outer member 202 is then coupled with the inner member 200 and drawn tight using the corresponding threaded portions 218, 240.

Figure 2:
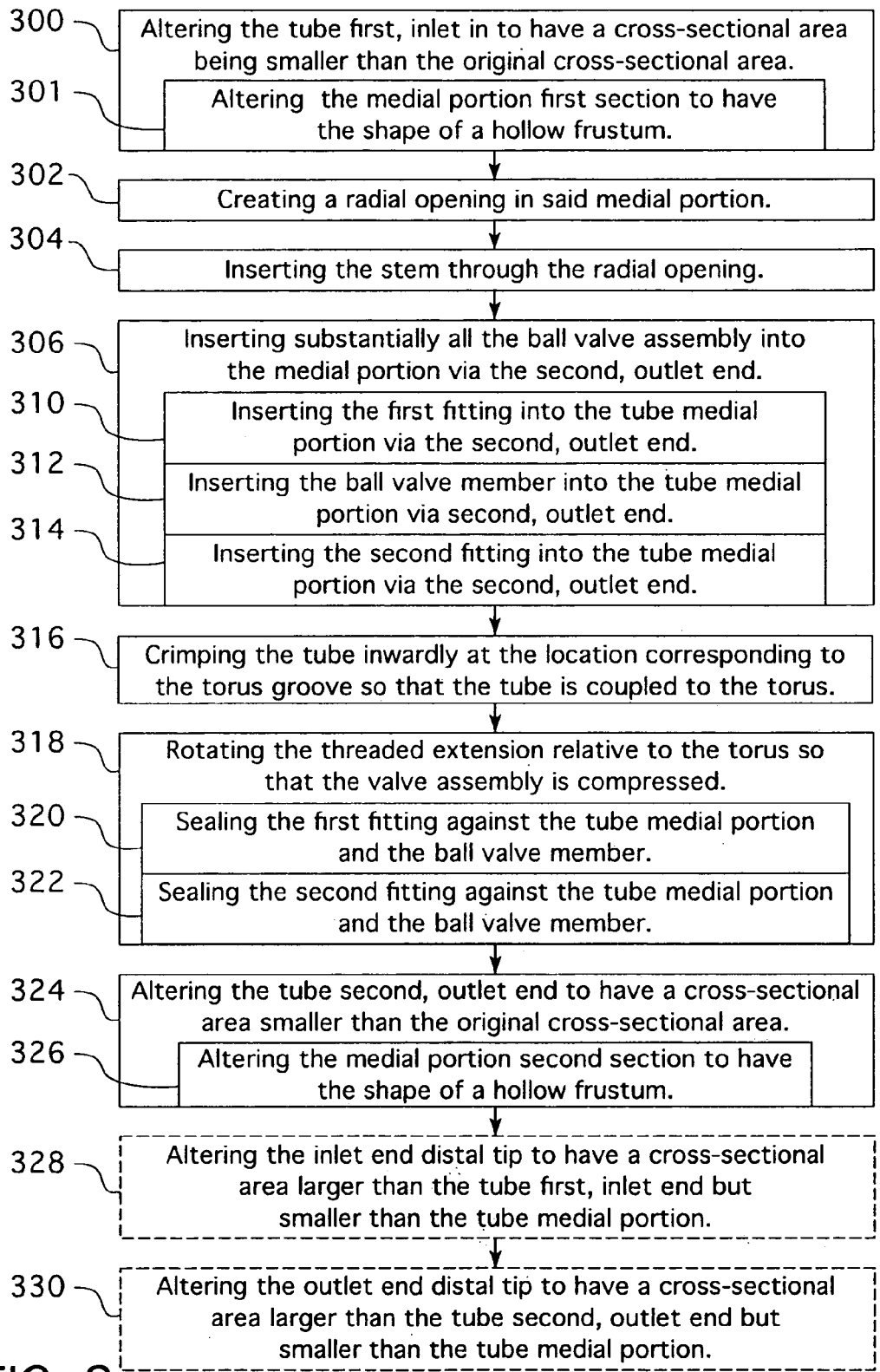
FIG. 2 is a flow chart of the method steps.

The ball valve 10 disclosed above is, preferably, manufactured according to the following steps and as shown in FIG. 2. Initially, the components of the ball valve assembly 50, identified above, a tube 12 having a generally constant cross-sectional area, and a stem neck assembly 40 are provided. If the sealing device 58 is similar to the sealing device 58 detailed above, the torus 102 is coupled to the second fitting 56. The tube 12 is, preferably, generally circular. The tube 12 has a first, inlet end 20, a medial portion 22, and a second, outlet end 24. The first, inlet end 20 is altered 300 to have a cross-sectional area being smaller than the original cross-sectional area. Additionally, while the first, inlet end is being altered 300, the medial portion first section 32 is altered 301 to have the shape of a hollow frustum. A radial opening 42 is then created 302 in the tube medial portion 24. The stem neck assembly 40 is then coupled 304 to the tube medial portion 24. As noted above, the stein neck assembly lip 47 is not crimped initially and, as such, the stem 60 is inserted 306 through the radial opening 42 and disposed within the stem neck assembly 40. The stem neck assembly lip 47 is then crimped to trap the stem 60. Substantially all of the ball valve assembly 50, except for the stem 60, is inserted 308 into the medial portion 22 via the second, outlet end 24. More specifically, the step of inserting 308 substantially all of the ball valve assembly 50 into the tube medial portion 22 via the second, outlet end includes the sub-step of 310 inserting the first fitting 52 into the tube medial portion 22 via the second, outlet end 24; inserting 312 the ball valve member 54 into the tube medial portion 22 via the second, outlet end 24; and inserting 314 the second fitting 56 into the tube medial portion 22 via the second, outlet end 24. Once the ball valve assembly 50 is disposed within the tube 12, the tube 12 is crimped 316 inwardly at a location corresponding to the torus groove 106 so that the tube 12 is coupled, and preferably attached, to the torus 102.

Once the torus 102 is coupled to the tube 12, the extension 88 with threads 89, and therefore the second fitting 56, is rotated relative to the torus 102 so that the valve assembly 50 is compressed. That is, as the ball valve assembly 50 is compressed, the first fitting 52 is sealed 320 against the tube medial portion 23 and the ball valve member 54 and the second fitting 56 is sealed 322 against the tube medial portion 24 and the ball valve member 54. Once the ball valve assembly 50 is in place and sealed, the tube second, outlet end 24 is altered 324 to have a cross-sectional area smaller than the original cross-sectional area. As the second, outlet end is altered 324, the medial portion second section 34 is altered 326 to have the shape of a hollow frustum. If desired, the first, inlet end distal tip 21 may be altered 328 to have a cross-sectional area larger than the tube first, inlet end 20 but smaller than the tube medial portion 22. Similarly, if desired, the second, outlet end distal tip 25 may be altered 330 to have a cross-sectional area larger than the tube second, outlet end 24 but smaller than the tube medial portion 22.

While specific embodiments of the invention have been described in detail, it will be appreciated by those skilled in the art that various modifications and alternatives to those details could be developed in light of the overall teachings of the disclosure. For example, the sealing device 58 could include a second torus (not shown) attached to the tube 12 at a location between the first fitting 52 and the first, inlet end 20. Such a torus would act as an alternate load bearing structure. As such, the first fitting 52 would not be required to have a stop surface 107. Accordingly, the particular arrangements disclosed are meant to be illustrative only and not limiting as to the scope of the invention which is to be given the full breadth of the claims appended and any and all equivalents thereof.

What is claimed is:

1. A method of making a unitary tube ball valve, said ball valve having an elongated tube with a cross-sectional area, a first, inlet end, a medial portion, and a second, outlet end, a ball valve assembly with an extension, said extension having threads on an outer surface, and a torus having an inner side and an outer side, said torus inner side having threads, said torus outer side having a groove, the torus inner side threads being coupled to the ball valve assembly extension with threads, said method comprising the steps of:

a) altering said tube first, inlet end to have a cross-sectional area being smaller than said original cross-sectional area;

b) inserting substantially all of said ball valve assembly into said tube medial portion via said second, outlet end;

c) crimping said tube inwardly at a location corresponding to said torus groove so that said tube is coupled to said torus;

d) rotating said extension with threads relative to said torus so that said ball valve assembly is compressed; and e) altering said tube second, outlet end to have a cross-sectional area being smaller than said original cross-sectional area.

2. The method of claim 1 wherein said ball valve assembly has a first fitting, a ball valve member, a stem, and a second ball valve assembly fitting, said extension with threads disposed on said second ball valve assembly fitting and wherein said steps of coupling said torus and said extension with threads and inserting substantially all of said ball valve assembly into said medial portion via said second, outlet end includes the steps of:

a) inserting said first fitting into said tube medial portion via said second, outlet end;

b) inserting said ball valve member into said tube medial portion via said second, outlet end; and c) inserting said second fitting into said tube medial portion via said second, outlet end.

3. The method of claim 2 wherein said method includes the further steps of:

a) creating a radial opening in said medial portion; and b) inserting said stem through said radial opening after said step of inserting said ball valve member via said second, outlet end.

4. The method of claim 2 wherein said first fitting is structured to sealingly engage said medial portion and said ball valve member, said second fitting is structured to sealingly engage said medial portion and said ball valve member, and wherein said step of rotating said extension with threads relative to said torus so that said ball valve assembly is compressed includes the further steps of:

a) sealing said first fitting against said tube medial portion and said ball valve member; and b) sealing said second fitting against said tube medial portion and said ball valve member.

5. The method of claim 1 wherein said step of altering said tube first, inlet end to have a cross-sectional area being smaller than said original cross-sectional area includes the step of:

a) altering a first section of said medial portion adjacent to said first, inlet end so that said medial portion first section is shaped as a hollow frustum.

6. The method of claim 5 wherein said step of altering said tube second, outlet end to have a cross-sectional area being smaller than said original cross-sectional area includes the step of:

a) altering a second section of said medial portion adjacent to said second, outlet end so that said medial portion second section is shaped as a hollow frustum.

7. The method of claim 1 including the further steps of:

a) altering the distal tip of said first, inlet end to have a cross-sectional area larger than said tube first, inlet end but smaller than said medial portion; and b) altering the distal tip of said second, outlet end to have a cross-sectional area larger than said tube second, outlet end but smaller than said medial portion.

* * * * *

UNITED STATES PATENT AND TRADEMARK OFFICE
CERTIFICATE OF CORRECTION

PATENT NO. : 7,337,797 B1
APPLICATION NO. : 11/440629
DATED : March 4, 2008
INVENTOR(S) : Pa It is certified that error appears in the above-identified patent and that said Letters Patent is hereby corrected as shown below:

Column 3, line 61, "the" should be --then--.
Column 4, line 59, "stein" should be --stem--.
Column 6, line 8, "stein" should be --stem--.

Signed and Sealed this

Second Day of December, 2008

JON W. DUDAS
*Director of the United States Patent and Trademark Office*